Oct. 25, 1932.  W. S. SMITH  1,884,320

WEIGHING SCALE

Filed June 30, 1930 4 Sheets-Sheet 1

Inventor
Walter S. Smith
By William Janns Atty.

Oct. 25, 1932.  W. S. SMITH  1,884,320
WEIGHING SCALE
Filed June 30, 1930  4 Sheets-Sheet 2

Inventor
Walter S. Smith
By William James Atty.

Patented Oct. 25, 1932

1,884,320

UNITED STATES PATENT OFFICE

WALTER STANDISH SMITH, OF COLUMBUS, OHIO, ASSIGNOR TO THE EXACT WEIGHT SCALE COMPANY, OF COLUMBUS, OHIO, A CORPORATION OF OHIO

WEIGHING SCALE

Application filed June 30, 1930. Serial No. 464,900.

This invention relates to new and useful improvements in weighing scales, the objects of the invention being generally to improve upon an simplify the construction of weighing scales.

Other objects of the invention are to provide a weighing scale of the torsion type having a computing chart with which cooperates a suitable indicator carried by the torsion elements and arranged so as to indicate the cost as well as the weight of the article.

Still other objects of the invention are to provide an improved mounting for the torsion element whereby the torsion of said element can be regulated, said element being adjustable to correlate the weighing mechanism and the indicator with the chart.

Further objects of the invention are to provide a weighing scale having a cooperating indicator arm and a chart, said chart being stationary and provided with an arcuate slot and having weight indicia on both sides adjacent to said slot and said indicator having a pointer operatively disposed within said slot and visible from both sides whereby reading of the scale can be obtained from both sides simultaneously.

Still further objects of the invention are to provide an improved means for mounting the indicator arm on said torsion element whereby said indicator is balanced in both planes.

Additional objects of the invention are to provide improved means for counterbalancing the lever of the scale and to provide a novel form of poise which is adapted to be detachably mounted on the adjustable end of said lever.

With these and other objects in view, my invention consists in certain novel features of construction and arrangement of parts, hereinafter more fully described and claimed, and illustrated in the accompanying drawings, in which—

Referring by numerals to the accompanying drawings, 10 indicates a base provided near one end with a casting 11 having a pair of upwardly projecting lugs 12. These lugs are spaced from each other transversely of the base and fulcrumed on said lugs is a lever 14. This lever is formed near one end of rectangular shape as indicated at 15 and the side members 15ª thereof are provided with knife-edge pivots 16 which rest in upwardly presented V-shaped grooves formed in blocks 17 which latter are mounted in the upper ends of lugs 12.

Side members 15ª are provided with upwardly presented knife edge pivots 18 on which rest V-shaped grooved blocks 19 of a hanger or support 20. This support is disposed within the rectangular portion 15 and carries a commodity platter or load platform 21.

A rod 22 extends downwardly from support 20 into the base 10 and is pivotally connected at its lower end to one end of a check link 24. This link extends forwardly in parallelism to lever 14 and is pivotally connected at its forward end to a stationary member, as indicated at 25, this pivotal connection being disposed in vertical plane with the fulcrum of the lever. This check link mechanism preserves proper operative relation of the commodity platter with respect to the lever and its use is well-known in the art.

The forward end of lever 14 extends into a housing 25 which is located near the other end of said base and extends upwardly therefrom.

This housing comprises a substantially box-shape lower portion 26 containing the operating mechanism and a fan-shaped upper portion 27 containing the indicating and computing means.

A torsion element 28 is disposed in lower portion 26 a suitable distance above lever 14 and transversely thereof. This element is of greater length than the depth of said portion 26 and extends outwardly therefrom through openings 29 formed in side walls 26ª of said housing 26. A mount 30 is secured to each side wall 26ª and extends a suitable distance outwardly therefrom. The outer end of each mount 30 is presented upwardly substantially parallel to the respective side wall, as indicated at 30ª. Each end 30ª is slotted vertically, as indicated at 30ᵇ, to a suitable depth and substantially in the same vertical plane with the torsion element 28. One of these ends 30ª is provided with a horizontally disposed seat 31 which is rectangular in cross section and slidably disposed in said seat is a clamp 32 to which is secured, by means of pins or rivets 33, one end of torsion element 28. This clamp 32 is provided with an outwardly presented threaded shank 32ª which extends outwardly from end 30ª and is adapted to receive a washer and nut 34. By turning nut 34 in proper direction clamp 32 is moved away from housing 26, thereby increasing the tension of element 28.

The other mount 30 is provided in its end 30ª with a seat 35 which is circular in cross section and receives a cylindrical member 36. One end of torsion element 28 is secured to the inner end of member 36 by means of pins or rivets 37. A nut and washer 38 is secured to the outer end of member 36 and bears against the outer side of end 30ª, thereby preventing longitudinal inward movement of member 36 and providing means for adjusting said member angularly. Member 32 is non-rotatably seated in the other mount 30 and holds the other end of element 28 in central or vertical position, while the other end of said element is adjusted angularly to the vertical plane by member 36.

Each end 30ª is provided above the respective seat with a clamping screw 37 by means of which the slotted halves can be drawn together to clamp therebetween and hold immovable the respective member 32 or 36. Members 32 and 36 can be either formed in two complementary sections riveted together or they can be formed of a single piece and provided with a slot for receiving the ends of element 28.

Tension member 28 has mounted thereon at a point intermediate its ends and centrally within housing 26 a member 38 which has an upwardly extending arm 39 and a pair of downwardly extending arms 40 spaced from each other so as to straddle lever 14. Upper arm 39 has fixed thereon an indicator 41 which extends upwardly into the fan-shaped housing 27 and is movable in a plane parallel with a chart 42. The ends of the depending arms 40 have fixed thereon weights 43 which counterbalance the indicator structure carried by upper arm 39. Member 38 is provided with a horizontally disposed opening 38ª through which the tension member 28 is threaded and is secured therein by wedge members 44 which are driven in said opening to each side of member 28 and clamp said member in position.

An arm 45 extends horizontally from member 38 and has pivotally connected thereto the upper end of a link 46, the lower end of which is pivotally connected to lever 14. Thus when said lever is actuated, member 38 is rocked correspondingly, thereby causing movement of indicator arm 41 relatively to chart 42 and distorting the central portion of tension element 28 relatively to its ends.

The extreme end of lever 14 terminates in a vertically disposed rectangular portion 14ª, the face of which is provided near each end with a horizontally disposed threaded opening 14ᵇ. A vertically disposed plate 47 is held in spaced relation with portion 14ª by screws 48 which latter extend from plate 47 and have their ends screw-seated in threaded openings 14ᵇ. An adjustable poise 49 is slidably mounted on said screws and is adjustable longitudinally of lever 14. A member 50 is secured, by means of screws 51, to plate 47 and extends outwardly therefrom and is provided with a saddle 52. A detachable poise or weight 53 is adapted to be seated in said saddle. The adjustable poise 49 is adjustable by means of an adjusting member 54 which is revolubly seated in member 50 and extends through members 50 and plate 47 and has its extreme end rotatably mounted in extension 14ª coaxially with the axis of lever 14. That portion of adjusting member 54 disposed intermediate of members 14ª and 47 is provided with a screw-thread which is engageable with the threaded opening formed in adjustable poise 49. Thus when adjusting member 54 is actuated, poise 49 is adjusted away or toward the fulcrum of the lever. Adjusting member 54 is held against longitudinal movement by a plate 55 which is attached to the outer end of saddle member 52 by a screw 56 and which has a semi-circular end engaging a groove 54$^b$ formed in member 54 near the outer end thereof.

The weight 53 is used to increase the capacity of the scale whereby a scale having, for instance, a normal capacity of ten pounds can have its capacity doubled by placing a ten pound weight 53 on saddle 52.

The upper portion of weight 53 is provided on its opposite sides with inclined faces 53$^a$ and each face has stamped thereon the number of pounds so that the capacity of the weight can be easily read from either side of the scale.

The fan-shaped housing 27 is provided with side walls 27$^a$ and 27$^b$. Side wall 27$^a$ is provided with a large opening 57 through which the chart 42 is visible. The side wall 27$^b$ is provided with a sight opening 58 through which only the upper portion of chart 42 is visible. Chart 42 is provided in its upper end with an arcuate slot 59 which is concentric with the oscillatory movement of indicator 41 and the upper edge of said slot is provided on both sides with weight indicia graduations 60. The forward face of the chart 42, which face is visible through the opening 57, is provided with a number of indicia 61 which indicate the cost of the article per pound, the indicia being computed to denote the total prices at various weights. The various prices are determined by a reading line 41$^a$ which is carried by the indicator 41, adjacent to a series of vertically disposed price per pound indications 42$^b$ which coincide with the computed indicia 61 on chart 42. The upper end of indicator arm 41 is provided with a pointer 41$^b$ which is operatively disposed within the slot 59 so that it can be used simultaneously in reading weight indicia on either side of the chart.

Chart 42 is held in position by screws 62 which are preferably arranged centrally of the chart and are screw-seated in bosses 64 extending inwardly from wall 27$^b$. Preferably chart 42 is formed slightly curved outwardly as indicated in dotted lines in Figure 16 and when said chart is secured in position by screws 62 the central portion of said chart is drawn inwardly, thereby flexing said chart and causing it to remain in a rigid position. Thus the chart is prevented from buckling and is held immovable. The side edges of the chart are adjustable so as to maintain the faces of the chart in close proximity to the indicator 41 and the reading line 41$^a$. This adjusting means comprises a plurality of screws 65 which are screw-seated in bosses 66 formed in wall 27$^b$. Each screw 65 is provided with a fixed collar or annular projection 67 bearing against the rear side of said chart.

A nut 68 is threaded on the outer end of each screw 65 and bears against the outer face of said chart whereby the edge of the chart can be moved toward or from the path of movement of indicator 41. Preferably the edge of the chart is provided with notches 63 through which the screw 65 passes outwardly. (See Figs. 3 and 17.)

Figures 16, 17, 18:
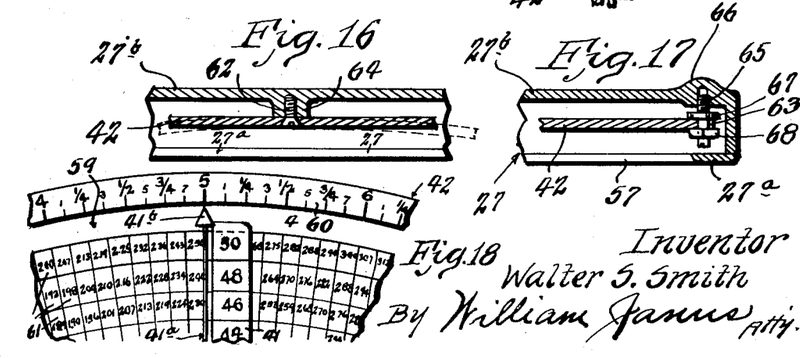
Figure 16 is a detail cross section showing means for mounting the chart in position.
Figure 17 is a detail cross section showing the means for adjusting the chart in a plane parallel to the movement of the indicator.
Figure 18 is an enlarged fragmental view of the chart and the indicator.

To adjust the chart rearwardly, screw 65 is turned in the proper direction so as to move the disk 67 rearwardly and nut 68 is screwed down so as to press the edge of the chart against said disk. To move the edge of the chart outwardly, nut 68 is loosened and screw 65 is manipulated to cause disk 67 to move outwardly against the rear side of the chart, thereby bringing the latter forwardy. Nut 68 is then screwed down to bring it in engagement with the chart.

A dashpot 69 is located in housing 26 and is connected to lever 14 by a rod 70.

Figures 1, 2, 3:
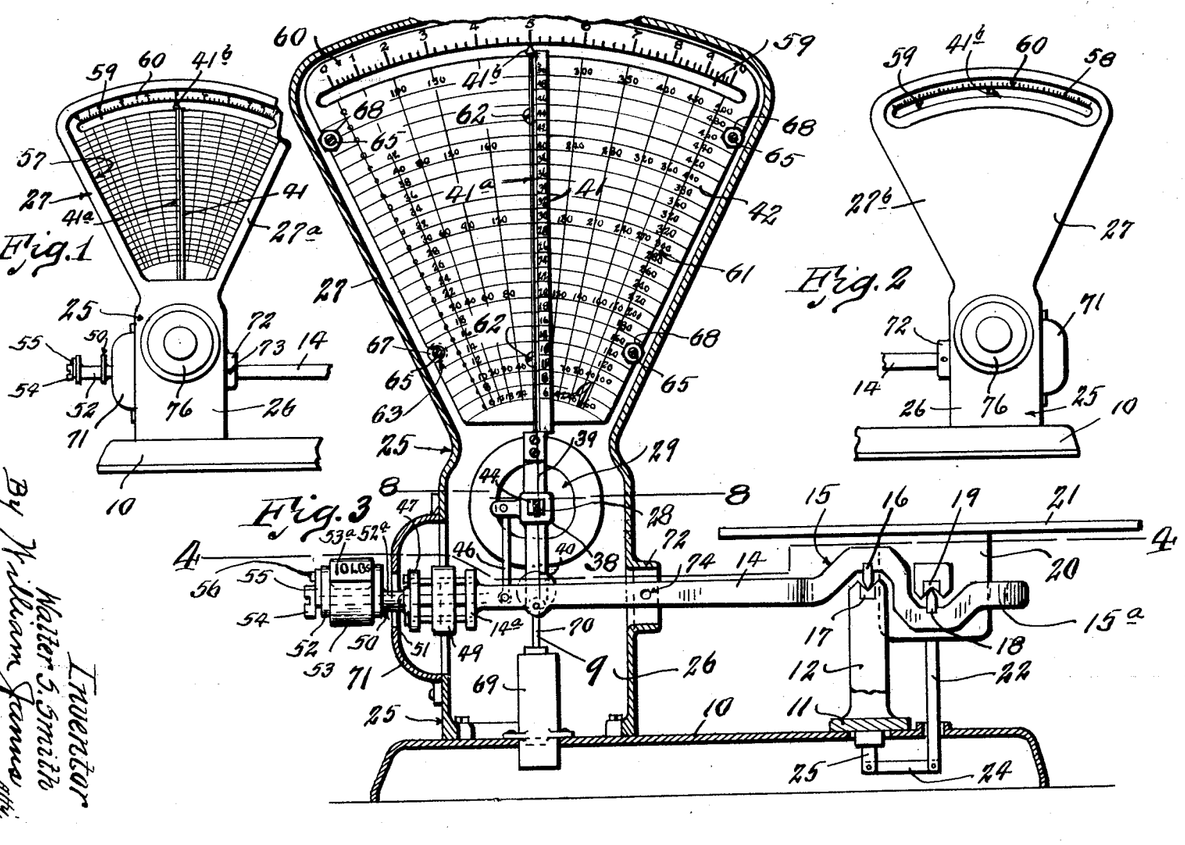
Figure 1 is a front elevational view of the scale, partly broken away.
Figure 2 is a rear elevational view of the scale, partly broken away.
Figure 3 is an enlarged vertical cross section taken longitudinally through the scale.
Figures 4, 5, 6, 7:
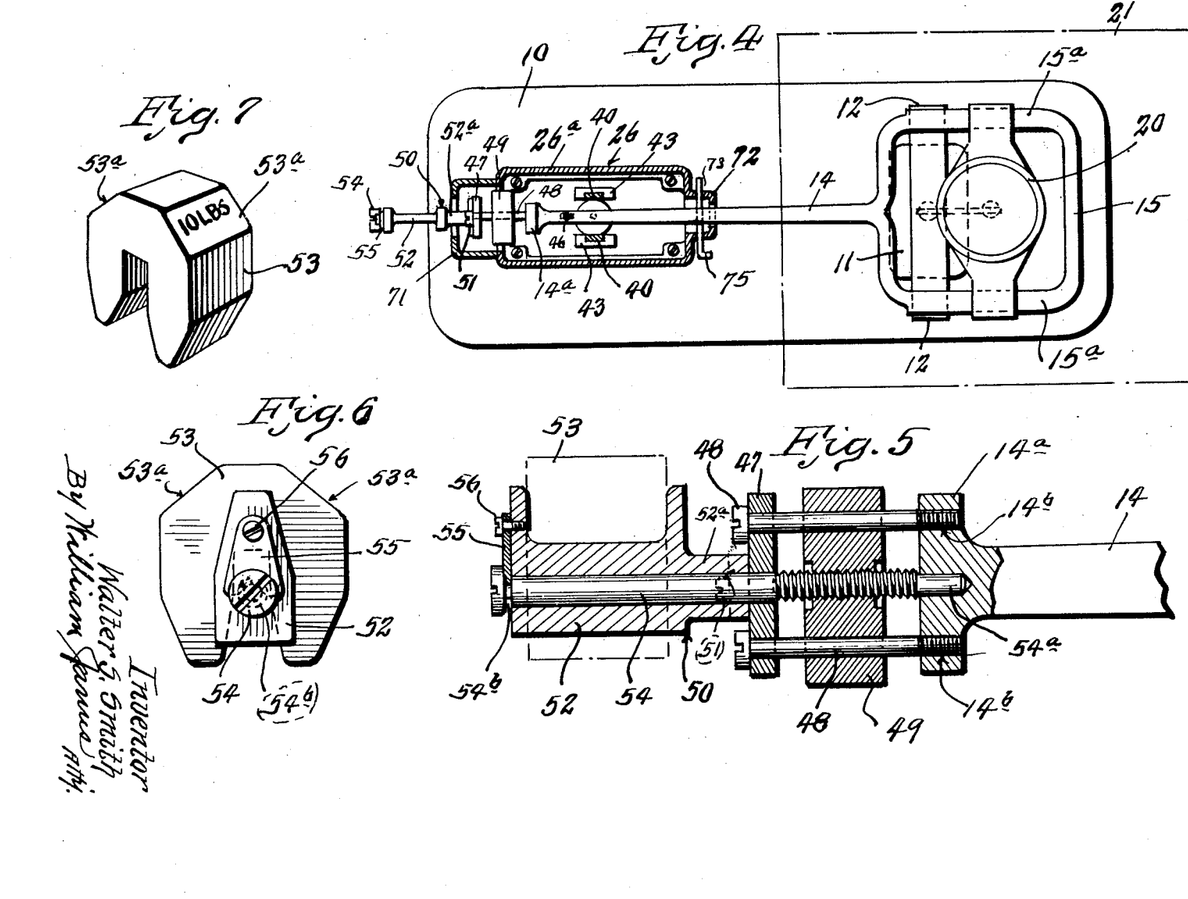
Figure 4 is a horizontal cross section through the scale taken approximately on line 4—4 of Figure 3.
Figure 5 is an enlarged detail cross section taken vertically through one end of the lever and the adjustable poise thereof.
Figure 6 is an end elevational view of same, showing the detachable poise.
Figure 7 is a perspective detail view of the poise.
Figure 8:
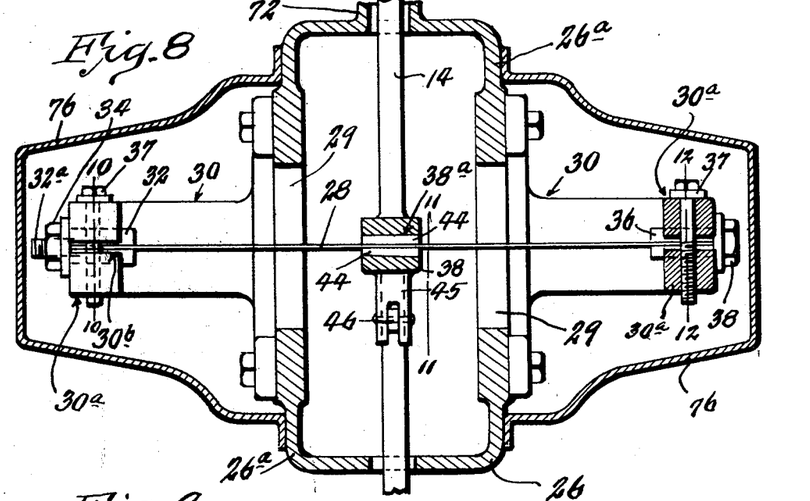
Figure 8 is an enlarged horizontal cross section taken on line 8—8 of Figure 3.
Figure 9:
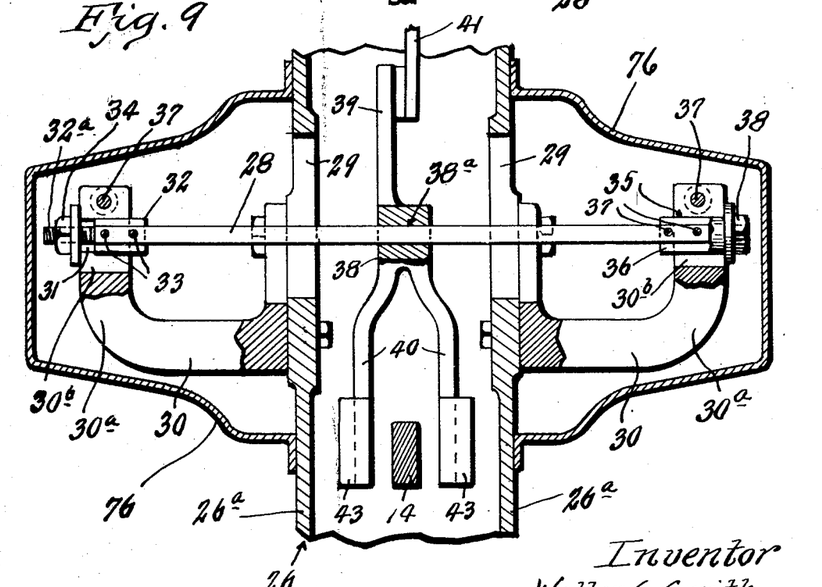
Figure 9 is a vertical cross section taken on line 9—9 of Figure 3.
Figures 10, 11, 12, 13, 14, 15:
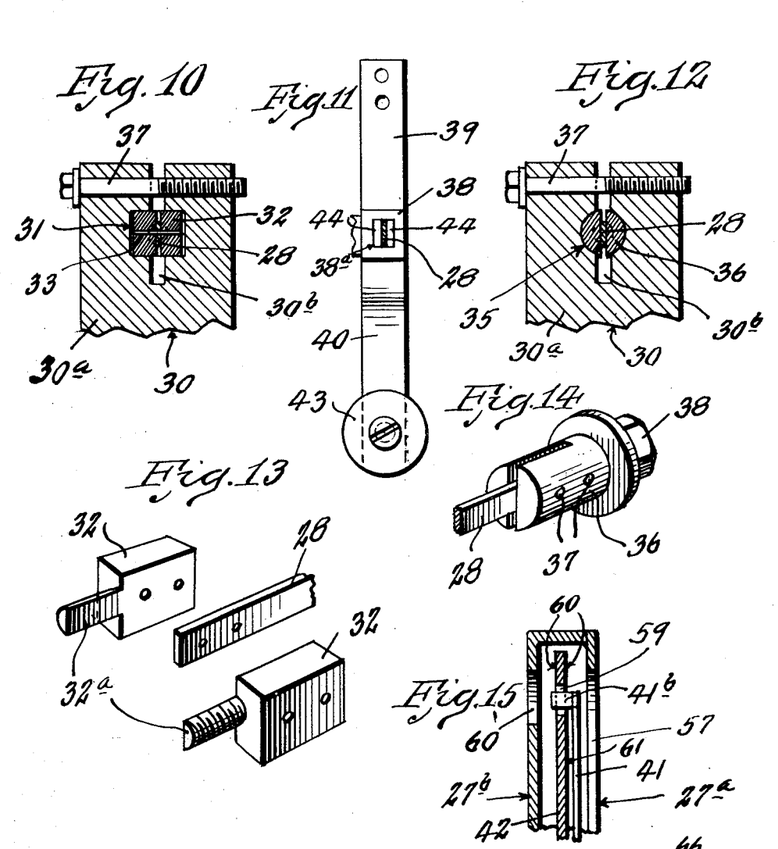
Figure 10 is a detail cross section taken on line 10—10 of Figure 8.
Figure 11 is a detail cross section taken on line 11—11 of Figure 8.
Figure 12 is a detail cross section taken on line 12—12 of Figure 8.
Figure 13 is a perspective detail view showing the means for regulating the torsion of the torsion element.
Figure 14 is a detail perspective view showing the means for adjusting the torsion element angularly.
Figure 15 is a detail cross section showing the chart and the indicator.

The adjustable poise assembly (poise 49, plate 47, and screws 48) is enclosed by a casing 71 which is detachably secured to the corresponding end wall of housing 26. This casing is provided with a vertically disposed slot through which shank portion 52$^a$ of saddle 52 projects outwardly. Thus the poise assembly is protected from interference by unauthorized persons and can be removed by removing casing 71. The opposite end wall of housing 26 is formed with an extension 72, the sides of which are provided with aligned apertures 73. Lever 14 is provided with an aperture 74 which is in alignment with apertures 73 when said lever occupies central position, such as shown in Figure 3. When in this position a pin 75 (see Fig. 4) can be inserted through said apertures to lock said lever against movement. This feature is desirable in adjusting the scale and also in shipping when it is desired to hold the lever immovable.

It will be seen that the base 10 has mounted thereon a lever support yoke 12 which carries lever 14. As shown, platter 21 is mounted on the lever back of the fulcrum. With this arrangement, a load applied to platter 21 raises the other end of the lever.

Indicator 41 is supported on torsion strip 28 which in turn is carried on tower structure 25.

This strip is supported by a torsion yoke which is made in two sections 30 attached to the opposite sides of the tower structure or housing 25.

The indicator structure is attached to torsion element 28 by two wedges 44 substantially centrally of yoke members 30. This arrangement allows the indicating structure free movement in said tower above and below the torsion element and also provides for wheel balance of said indicating structure.

By virtue of link connection 46, which engages lever 14 and the indicator structure, the assemblage is made with the lever occupying true horizontal position and the indicator disposed in exact vertical position. The torsion band or strip 28 is also in true vertical relation with the indicator. When in this position the indicator is located in half the capacity of chart 42.

As stated before, one end of the torsion band is carried by the square members 32, while the other end is carried by round members 36. This arrangement permits the tautness of the band to be adjusted through the square members while the relative position of the indicator structure with the center of the dial or chart is adjusted through the round member.

In sealing this scale, this is the first condition of balance to be attained. A balance weight 49 is now applied to the lever 14. This actuates said lever and causes the indicator to move back to the zero position. Both the lever and its balance weight assembly have equal weight distribution above and below the lever range line as obtained from knife edges 16 and 19. Consequently any balance adjustment made through the medium of the weight 49 does not disturb the seal of the scale.

Thus the indicator 41 is pulled down to the zero position and the torsion band 28 is moved from its true vertical or central position. As the indicator travels the chart, the relieving of the applied pressure to the torsion band up to the single position of the chart gives the lefthand side or reading of said chart. From the center of the chart over to the right side the lever pushes the indicator structure, through the medium of link 46, and flexes the medial portion of the torsion band from its true vertical position to the opposite side. Thus the weight indicia arranged to each side of the center line of the chart are substantially alike and are arbitrarily arranged to compensate for the differential pressure or force produced by the flexion of the torsion element.

The spacing of weight indicia on the chart is arranged to correspond to the travel of the indicator under the load. It will be noted that the weight indicia are not equally spaced from each other but are arbitrarily arranged to compensate for the force expended in overcoming the spring resistance of the torsion element during the flexion thereof. Thus the graduations or weight indicia are grouped closer together toward each side of the chart in proportion to the distance from the center. This is because of the fact that the flexion of the torsion element is gradually less toward the center of the chart so that at the central point the torsion element has no torque or stored energy. Thus in a scale of a ten pound capacity, when a five pound load is placed on the platter, the indicator is centrally located and occupies true vertical position. To obtain the zero point, the five pound load is removed from the platter whereupon the indicator moves to the extreme left position which is the zero point. A ten pound load is then placed on the platter and the indicator moves to the extreme right position. The zero and the ten pound points should be equally spaced from the center (five pounds). If there is a discrepancy in the relative distances, then the torsion element is adjusted relative to the vertical plane by adjusting the round member 36. The remaining divisions or weight indicia can now be determined either by actual weighing operation or by the use of a control curve having equal divisions and which are projected on to the curve of the chart. In a ten pound chart, the weight indicia are by ounces and in a five pound chart the weight indicia are by half ounces. As stated before, the capacity of the scale can be doubled by using saddle weight 53. On the indicator, the price per pound indications $42^b$ read from 6 to 50 cents and on the chart the computed indicia 61 indicates the total cost in cents.

Obviously various changes in the construction and arrangement of my improved scale, other than those herein shown, can be made and substituted, without departing from the spirit of my invention.

I claim:

1. A weighing scale comprising in combination a base, a lever fulcrumed thereon, a load receiving platform pivotally mounted on said lever near said fulcrum, a torsion element disposed transversely above said lever, a mount for anchoring each end of said torsion element, an indicator fixed to said torsion element intermediate the ends thereof and extending radially therefrom, an arm extending from said indicator at an angle thereto and to said torsion element, a link pivotally connected at one end to said arm and at the other end to said lever, a chart stationarily arranged adjacent to the plane of movement of said indicator, said chart having arcuate slot near its upper end and being provided on one side with price indicia and provided on both sides with weight indicia, a hair line member carried by said indicator for reading said price indicia, and a pointer carried by the upper end of said indicator and arranged within said slot for simultaneously indicating the weight indicia on both sides of said chart.

2. A weighing and computing scale comprising in combination a support, a lever fulcrumed thereon, a load platform carried by one end of said lever, a torsion element disposed transversely above the other end of said lever, a mount for anchoring the ends of said torsion element, a balanced member fixed to said torsion element, a link operatively connecting said balanced member with said lever, a fixed chart provided with weight indicia and price indicia, an indicator fixed to said balanced member and extending radially from said torsion element and movable over the face of said chart, said indicator including a hair line member for reading the price indicia, and a pointer for reading the weight indicia, said indicia being correlated with each other, and an adjustable poise mounted on that end of the lever which is operatively connected to said torsion element.

3. A weighing scale comprising in combination a support, a lever fulcrumed thereon, a commodity receiving platter pivotally carried by said lever near its fulcrum, a torsion element disposed transversely and above said lever in spaced relation with the fulcrum thereof, a mount for anchoring the ends of said element, means in said mount for adjusting one end of said torsion element to regulate the tension thereof and for adjusting the other end of said torsion element angularly relatively to the longitudinal axis of said elements, a balanced member fixed on said torsion element intermediate the ends thereof, a link pivotally connected to said lever and to said balanced member whereby said lever is restored to zero position by the tension of said element when the load is removed and whereby said torsion element is flexed in opposite direction when a load is placed on said platter, a fixed chart provided with suitable indicia, and an indicator fixed to said balanced member and extending radially therefrom, said indicator being operable relatively to said indicia in accordance with the flexion of said torsion element.

4. A weighing scale comprising in combination a support, a lever fulcrumed thereon, a commodity receiving platter pivotally carried by said lever near its fulcrum, a torsion element disposed transversely and above said lever in spaced relation with the fulcrum thereof, a mount for anchoring the ends of said element, means in said mount for adjusting one end of said torsion element to regulate the tension thereof and for adjusting the other end of said torsion element angularly relatively to the longitudinal axis of said element, a balanced member fixed on said torsion element intermediate the ends thereof, a link pivotally connected to said lever and to said balanced member whereby said lever is restored to zero position by the tension of said element when the load is removed and whereby said torsion element is flexed in opposite direction when a load is placed on said platter, a fixed chart provided on one side with price indicia and provided near its upper end with an arcuate slot concentric with the axis of said torsion element, there being weight indicia arranged on each side of said chart adjacent to said slot, and an indicator fixed to said balanced member and extending therefrom, said indicator having a hair line member extending across the price indicia of said chart and said indicator having a pointer projecting into said slot and operable simultaneously to select the weight indicia on both sides of said chart and in conjunction with the selection of the price indicia.

5. A computing scale comprising in combination a base, a lever fulcrumed thereon, a commodity platter pivotally carried near one end of said lever, a torsion element disposed transversely of said lever near the other end thereof, mounts for anchoring the ends of said torsion element, a balanced member secured to said torsion element, a connecting link pivotally connecting said balanced member with said lever, an indicator carried by said balanced member, and a fixed chart arranged in a plane parallel with the plane of movement of said indicator, said chart having an arcuate slot near its upper end being provided on both sides with weight indicia and on one side with price indicia, and said indicator being provided with a pointer disposed within said slot for simultaneously indicating the weight indicia on both sides of said chart, said indicator being further provided with a reading line member cooperating with the price indicia.

6. A computing scale of the class described comprising in combination a base, a lever fulcrumed thereon, a commodity platter pivotally mounted near one end of said lever, a torsion element disposed transversely above the other end of said lever, mounts for anchoring the ends of said torsion element, a balanced member secured to said torsion element and provided with a laterally projecting arm, a link pivotally connected to said arm and to said lever whereby said torsion element is operatively connected to said lever, an adjustable poise arranged on that end of the lever adjacent to said torsion element, said torsion element being flexed to normally bring said lever to zero position, a stationary chart provided on one side with price indicia and having its upper end formed with an arcuate slot and provided with weight indicia on both sides and adjacent to said slot, an indicator carried by said balanced member and operable in a plane parallel to the face of said chart, a hair line reading member carried by said indicator for selecting the price indicia, and a pointer carried by the upper end of said indicator and projecting laterally therefrom into said arcuate slot whereby said pointer is visible from either side of said chart and cooperates with the weight indicia on both sides.

7. In a weighing scale, the combination with a lever, of a torsion element having its ends anchored, means for operatively connecting said torsion element to said lever, an arbitrary chart having weight indicia arranged to compensate for the difference in flexion of said torsion element, and an indicator carried by said element and movable thereby relatively to said chart.

8. In a weighing scale, the combination with a lever, of a torsion element operatively connected to said lever and flexed in one direction to maintain said lever in zero position, said torsion element being operable to be flexed in the opposite direction in accordance with the weight placed on said lever, a differential chart having weight indicia arranged to compensate for the difference in flexion of said torsion element, and an indicator carried by said element and operable thereby.

9. In a scale of the class described, the combination with a lever, of a torsion element operatively connected to said lever, a pair of mounts, a member secured to one end of said torsion element and adjustably mounted in one of said mounts for movement in longitudinal directions to regulate the tension of said torsion element, said member being held against rotative movement, a member secured to the other end of said torsion element and rotatably mounted in the other mount for adjusting said torsion element angularly to regulate the flexion thereof, said member being held against longitudinal movement.

10. In a scale of the class described, the combination with a chart housing and an indicator oscillably mounted therein, of a chart secured thereto at central spaced points, and a plurality of adjustable members engaging said chart along its edges at a plurality of spaced points, each of said adjustable members being provided with lateral portions for engaging both sides of the chart whereby said chart can be adjusted in a plane parallel with the travel of said indicator.

11. In a scale of the class described, the combination with a chart housing and an indicator movable in a vertical plane, of a vertically disposed chart, means for securing said chart at spaced points to said housing, and a plurality of adjustable members engaging the edges of said chart at a plurality of spaced points, each of said adjustable members being provided with an annular flange bearing against one side of the chart and with an adjustable nut bearing against the outer side of said chart, whereby the edges of said chart can be adjusted relatively to the plane of movement of said indicator.

12. A computing scale comprising in combination a base, a balanced lever, a commodity platter mounted on said lever near one end thereof, a torsion element disposed transversely of said lever, mounts for anchoring the ends of said torsion element in spaced relation and to each side of said lever, an indicator fixed to said torsion element intermediate the ends thereof, a weight member associated with said indicator for counterbalancing the same, an arm extending from said indicator radially to the movement thereof, a connecting link pivotally connected to said arm and to said lever whereby said indicator is balanced in combination with said weight member and with said balanced lever, said indicator being provided with a plurality of price per pound indications, and a stationary chart arranged to one side of said indicator in a plane parallel to the path of travel thereof.

13. A computing scale of the class described comprising in combination a base, a balanced lever fulcrumed thereon, a commodity platter pivotally supported near one end thereof, an upwardly housing fixed to said base near the opposite end of said lever, a torsion element disposed transversely of said lever, mounts secured to the side walls of said housing and having secured thereto the ends of said torsion element in spaced relation with said lever, an indicator fixed to said torsion element within said housing, a weighted member fixed to said indicator and depending below said torsion element for counterbalancing said indicator, an arm fixed to said indicator and extending therefrom radially of said torsion element, a connecting link pivotally connected at one end to said arm and at the other end to said lever whereby said indicator is arranged in balanced relation with said lever, said indicator being provided with a reading line and a plurality of price per pound indications, a pointer carrier by the upper end of said indicator, and a stationary chart fixed to one side of said housing in a plane parallel to the path of travel of said indicator and provided with a plurality of figures coinciding with the indications on said indicator and correlated to said reading line to give the total cost of the commodity being weighed, said chart being provided with weight indications arranged adjacent to the path of said pointer, said weight indicia and said cost figures being arbitrarily arranged on said chart to compensate for the differential movement of the indicator produced by the flexion of said torsion element.

14. In a scale of the class described, the combination with a lever, of a torsion element disposed transversely thereof and anchored at its ends in spaced relation with said lever, means for operatively connecting said lever with the intermediate portion of said torsion element, whereby the movement of said lever flexes said torsion element, an arbitrary chart having weight indications arranged thereon to compensate for the flexion of said torsion element, and a balance indicator mounted on said element and movable by the flexion thereof in correlation with said chart.

15. In a scale of the class described, the combination with a lever, of a pair of mounts arranged to each side of said lever, a torsion element disposed transversely of said lever and having its ends anchored in said mounts, means for operatively connecting said lever with the intermediate portion of said torsion element, whereby the movement of said lever flexes said element, an arbitrary chart having weight indicia arranged to each side of its center and spaced so as to compensate for the flexion of said torsion element to each side of its true vertical normal position, and an indicator mounted on said torsion element and balanced both in vertical and horizontal planes, said indicator being movable in correlation with said chart by the flexion of said torsion element.

16. In a scale, the combination of a horizontally disposed balance lever, a torsion band disposed horizontally and transversely of said lever with its plane in a vertical position, and an indicator structure fixed to said torsion band intermediate the ends thereof, said structure including an upwardly projecting arm carrying a ready line element and a pointer element, a crank arm extending from said structure radially to said torsion band, a weight member depending from said indicator structure for counterbalancing the latter, and a connecting link pivotally connected to one end of said radial arm and to said lever, whereby said indicator structure is balanced both in vertical and horizontal planes.

17. In the scale, the combination of a horizontally balanced lever, a stationary chart having a central point and weight graduations arbitrarily spaced therefrom, a torsion element disposed transversely of said lever and operatively connected thereto, said element occupying a vertical position when said lever is disposed in a horizontal plane, and an indicator fixed to said torsion element and balanced relatively to the vertical and horizontal planes and correlated with the central portion of said chart, when said lever is moved from its horizontal balanced position, said torsion element is flexed from vertical position and said indicator is moved from the central portion, said weight graduations being arbitrarily arranged in accordance with the flexion of said torsion element.

18. In a scale, the combination of a horizontally balanced lever, a stationary chart having a central point and a zero mark disposed on one side of said center and a full capacity mark disposed on the other side thereof, said marks being spaced equidistant from said center, an indicator structure, a torsion element for supporting said structure and maintaining it in vertical position, said indicator structure being balanced in vertical and horizontal planes and operatively connected to said lever, and a weight placed on said lever to bring said lever and said indicator structure to the zero marking, thereby flexing said torsion element in one direction, said torsion element being flexed in opposite direction by the load when said torsion element and said indicator structure pass said central point.

In testimony whereof I hereunto affix my signature this 14th day of May, 1930.

WALTER STANDISH SMITH.